March 24, 1925.
C. R. JOHNSON
HAYRACK ATTACHMENT
Filed May 5, 1924
1,530,945
2 Sheets-Sheet 2
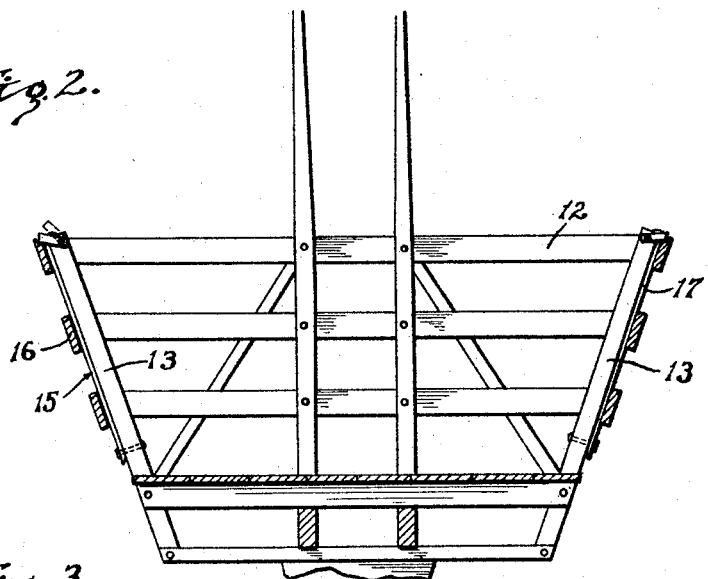
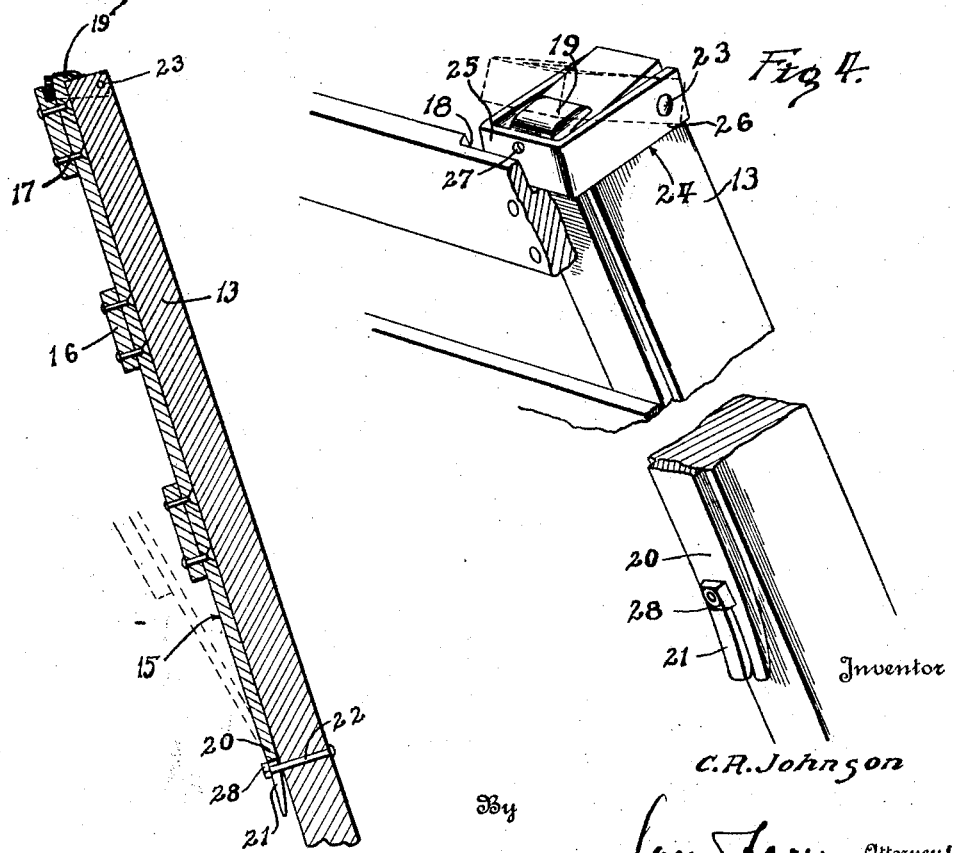
Inventor
C. R. Johnson
By Lacey & Lacey, Attorneys Patented Mar. 24, 1925.

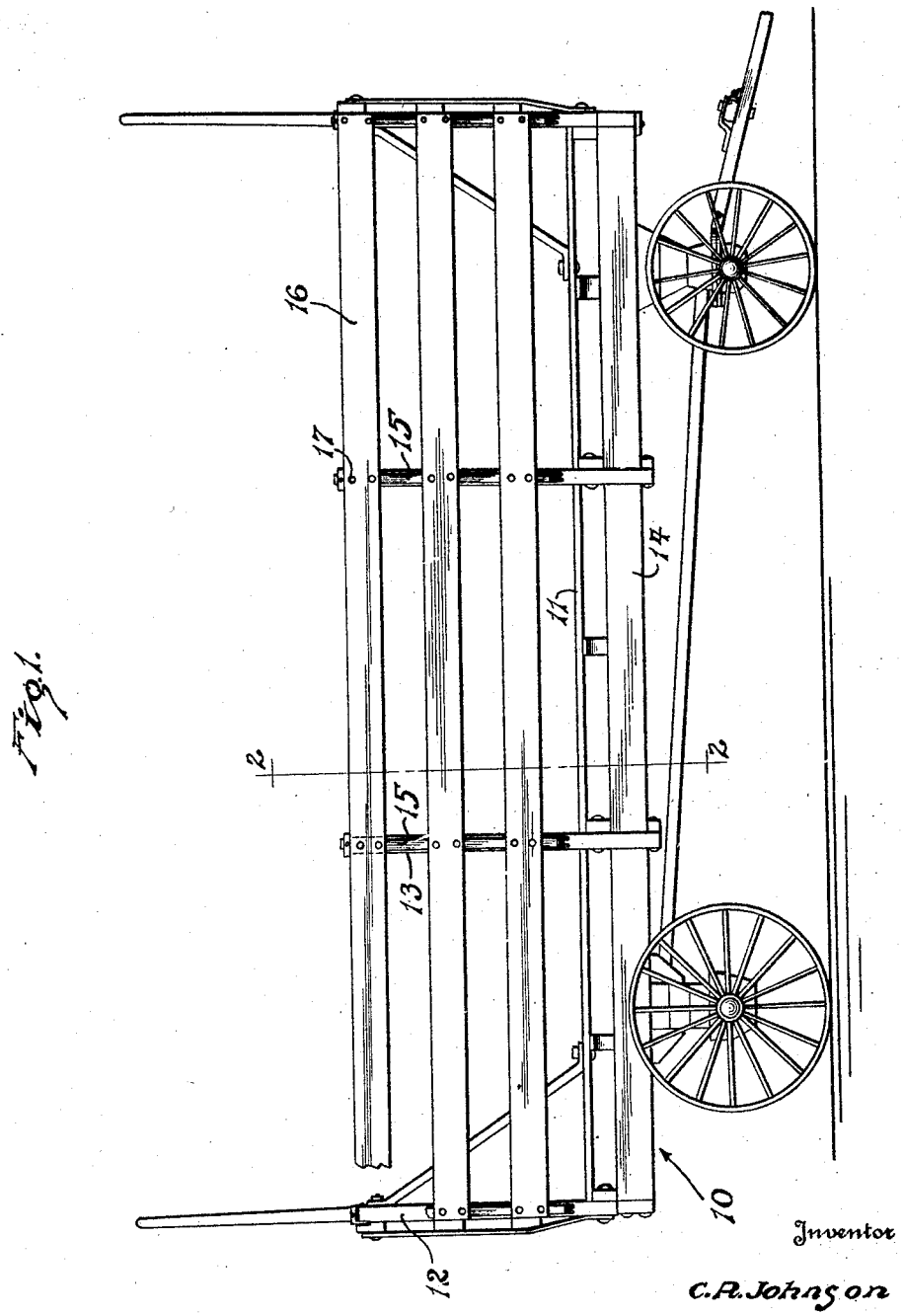

1,530,945

UNITED STATES PATENT OFFICE.

CECIL R. JOHNSON, OF SYLVIA, KANSAS.

HAYRACK ATTACHMENT.

Application filed May 5, 1924. Serial No. 711,175.

*To all whom it may concern:*

Be it known that I, CECIL R. JOHNSON, a citizen of the United States, residing at Sylvia, in the county of Reno and State of Kansas, have invented certain new and useful Improvements in Hayrack Attachments, of which the following is a specification.

The present invention relates to hay racks and aims at providing attachments for the same which may be installed on new hay racks when being built or applied to ordinary hay racks without any appreciable change. These attachments comprise gates or sides adapted to be quickly and easily secured to the stakes of a hay wagon and as easily removed. With the gates in position, the rack is used for hauling hay, straw and the like, and with the gates removed a flat bottomed wagon is produced suitable for hauling corn and fodder, or, in fact, any crop harvested with a corn binder. The wagon may also be used for hauling fence posts, lumber, household goods and the like.

The main object of the invention is to construct the gates in such a manner that they may quickly be removed from the permanent stakes to which they are attached on the wagon body and for this reason the gates are built with fork-shaped elements adapted to engage projecting bolts on the stakes and with hooks at their upper ends suspending the gates from the tops of the stakes.

A further object of the invention is to provide the stakes with clasps hinged thereon and adapted to be swung over the hooks to firmly hold the gates against the stakes.

In the accompanying drawings, one embodiment of the invention is illustrated, and—

Figure 1 is a side elevation of a convertible hay rack with the gates in position;

Figure 2 is a transverse section on the line 2—2 of Figure 1 of the hay rack with the gates in position;

Figure 3 is a section of one of the gates attached to a stake, and

Figure 4 is a fragmentary perspective view of a stake with the gate in position.

In the drawings, reference numeral 10 represents the hay rack provided with a floor 11, upright ends 12 and takes 13 permanently secured to the floor 11 and frame or understructure 14 of the hay rack. The stakes 13 are preferably inclined outwardly, as best seen in Figure 2.

Each side or gate comprises a plurality of flat straps 15 preferably made of band iron and forming the uprights. To these uprights are riveted, as at 17, a number of boards 16, the rivets 17 having their inner heads countersunk in the straps or uprights 15 so that the boards may fit closely against the outer surfaces of the stakes 13, as best seen in Figure 3. The uppermost one of the boards 16 is recessed on its inner side, as at 18, for a purpose which will be described further on.

The top end of each strap or upright is bent inwardly to form a flat hook 19 as clearly seen in Figures 3 and 4. These hooks are adapted to engage with the top ends of the stakes 13, in this manner suspending the gates on the stakes. The lower ends of the straps or uprights 15 are bent slightly in an outward direction, as at 20, and are bifurcated, as at 21, so that when the gates are in position the straps will fit snugly against the stakes along the greater portion of their length, but the bent ends 20 will project away from the stakes. This is best seen in Figures 3 and 4 of the drawings. Securing bolts 22 are furnished on the stakes and project with their outer ends beyond the outer face of each stake, as seen in Figure 3, in order to accommodate the bifurcated ends 21 of the straps or uprights. These outer ends carry nuts or heads 28. The relative position of the parts is such that the straps do not ride on the bolts but are held against the stakes by said heads or nuts 28. The entire weight of each gate is accordingly suspended upon the tops of the stakes by means of the hooks 19.

At the upper end of each stake is hinged, as at 23, a clasp 24 having a transverse front portion 25 and two side arms 26. The side arms fit closely against the sides of the stakes while the front portion 25 is spaced outwardly from the outer face of the corresponding stake. Near the upper edge of the clasp is provided an aperture 27 intended for a releasing tool adapted to lift the clasp from its engaged to its disengaged position.

When a gate is to be attached to the body of the wagon to form the hay rack, the bifurcated ends 21 are dropped over the bolts 22 with the gate leaning away slightly from the stakes, as indicated in dotted lines in Figure 3. After the bifurcated ends have all engaged the corresponding bolts 22, the upper end of the gate is pushed against the stakes, the clasps 24 having been previously raised. The hooks 19 will now enter over the tops of the stakes and rest thereon to support the gate. At the same time the bent portion 20 at the lower end of each strap 15 will swing away from the stakes and press against the nut or head 28 at the outer end of the bolt 22. As the hooks 19 slide upon the tops of the stakes, the lower bifurcated ends 21 will be drawn slightly upwards so that the bottom of the recess formed will be lifted from the bolts and no pressure in vertical direction will be exerted against the bolts by the gate. With the gate held closely against the stakes, all the clasps 24 will now be lowered so that their front portions will engage over the hooks, as indicated in Figures 3 and 4, the lower edge of each clasp falling into the corresponding recess 18 of the top board on the gate. The clasp 24 has a sufficiently tight hold against the outer face of its corresponding strap, thereby preventing it from jumping out while the gate is in position.

In order to remove the gates all the clasps 24 will have to be swung upwardly, as indicated in dotted lines in Figure 4. This disengagement is accomplished by means of a tool preferably the one described in my copending application for "tool for farm wagons", filed simultaneously herewith. A projecting point of the tool is inserted in the aperture 27 while its forward end rests on top of the hook 19 and by gripping the handle of the tool the latter is swung upwardly thereby providing a sufficient leverage to raise the clasp 24. As soon as all of the clasps have been lifted out of engagement with the straps the gates will fall away from the stakes, thus releasing the hold of the bolts 22 on the bifurcated ends of the straps and the gates are then ready to be lifted off the bolts.

The gates including the supporting bolts and the clasps, forming the hay rack attachments, are intended to be manufactured complete for the market for use on old wagons or for installment on new constructed wagons.

Having thus described the invention, what is claimed as new is:

1. Attachments for farm wagons comprising side gates, means for detachably securing said gates to the stakes of a wagon, said means including gripping members forming uprights of the gates, lateral projections on said members adapted to engage with the upper ends of said stakes, and clasps on said stakes adapted to be swung into engagement with said members.

2. Attachments for farm wagons comprising side gates, means for detachably securing said gates to the stakes of a wagon, said means including gripping members forming uprights of the gates, and clasps on said stakes adapted to be swung into engagement with said members, said gripping members comprising metal straps having hooked upper ends adapted to engage with the upper ends of the stakes.

3. Attachments for farm wagons comprising side gates, means for detachably securing said gates to the stakes of a wagon, said means including gripping members forming uprights of the gates, and clasps on said stakes adapted to be swung into engagement with said members, said gripping members comprising metal straps having hooked upper ends adapted to engage with the upper ends of the stakes, the lower ends of said straps being bifurcated, and elements on said stakes adapted to engage with said bifurcated ends.

4. Attachments for farm wagons comprising side gates, means for detachably securing said gates to the stakes of a wagon, said means including gripping members forming uprights of the gates, clasps on said stakes adapted to be swung into engagement with said members, said gripping members comprising metal straps having hooked upper ends adapted to engage with the upper ends of the stakes, the lower ends of said straps being bifurcated and bent outwardly from the main plane of the gates, and bolts on the stakes adapted to grip the bifurcated ends tightly when the gates are in position.

In testimony whereof I affix my signature.

CECIL R. JOHNSON.